United States Patent [19]

Fendley et al.

[11] Patent Number: 5,305,985

[45] Date of Patent: Apr. 26, 1994

[54] VALVE

[75] Inventors: Richard J. Fendley, Seabrook; Linda M. White, Friendswood, both of Tex.; James R. Meyer, Baton Rouge, La.

[73] Assignee: Ethyl Corporation, Richmond, Va.

[21] Appl. No.: 56,167

[22] Filed: Apr. 30, 1993

[51] Int. Cl.⁵ .......................... F16K 1/20; F16K 1/48
[52] U.S. Cl. ...................................... 251/85; 251/86; 251/298; 251/356; 251/359
[58] Field of Search ............... 251/85, 86, 298, 299, 251/356, 359, 363

[56] References Cited

U.S. PATENT DOCUMENTS

| | | | |
|---|---|---|---|
| 2,398,089 | 4/1946 | Fehr | 251/86 X |
| 2,573,623 | 10/1951 | Stover | 251/85 |
| 2,835,269 | 5/1958 | Seymour | 251/298 X |
| 2,907,342 | 10/1959 | Berg et al. | 251/86 X |
| 2,925,827 | 2/1960 | Anderson et al. | 137/527.4 |
| 2,939,616 | 6/1960 | Whittom et al. | 251/95 X |
| 2,969,492 | 1/1961 | Wheatley | 137/527.4 |
| 3,060,961 | 10/1962 | Conley | 137/527.4 |
| 3,066,693 | 12/1962 | Taylor et al. | 137/454.2 |
| 3,072,141 | 1/1963 | Wheeler, Jr. | 137/512.1 |
| 3,074,429 | 1/1963 | Farrow | 137/527.8 |
| 3,727,880 | 4/1973 | Stock | 251/85 |
| 3,831,622 | 8/1974 | Grewer et al. | 251/86 X |
| 4,033,549 | 7/1977 | Stamer | 251/298 X |
| 4,362,180 | 12/1982 | Frisch | 251/85 X |
| 4,480,812 | 11/1984 | Carpentier | 251/298 X |
| 4,498,492 | 2/1985 | Carpentier | 251/298 X |

Primary Examiner—John Rivell
Attorney, Agent, or Firm—David M. Bunnell

[57] ABSTRACT

An improved valve of the flapper plate type is disclosed, the valve comprising at least one flexible member for connecting the flapper plate and the arm actuating the flapper. The flexible member absorbs impact energy and allows restricted three dimensional movement of the flapper plate. The seals for the flapper plate and the seat comprise electrically conductive sealing materials.

18 Claims, 2 Drawing Sheets

VALVE

FIELD OF THE INVENTION

The invention relates to a novel valve, particularly a valve which is useful for regulating the flow of fine powder material.

BACKGROUND OF THE INVENTION

Operation of many industrial processes requires regulation of flow of extremely fine or ultrafine powdery materials, often under circumstances that permit or tolerate only minimal leakage of the powder or any transporting gas. Where the powder is transported from a vacuum system, leakage of air or other gas by the valve destroys the vacuum and the efficiency of transport in the system. Additionally, many ultrafine particles are pyrophoric or highly combustible, so that leakage of air by the valve can result in an explosion hazard. Again, if the powder is an electrically conductive material, electric discharge on opening of certain types of valves may cause erosion of the valve seat at the least and explosion at the worst.

The regulation of transport of fine aluminum powder (e.g., 25 microns) has posed a significant problem. This material, though normally at least partially oxidized because of its pyrophoric nature, is electrically conductive and tends to stick to all valve components.

Among those valves previously employed in transport in such processes are valves referred to as flapper or clapper valves. These valves utilize a closing plate or disc anchored on and moving around a pivot, the plate being brought into sealing engagement with a seat for closing. In one valve that has seen duty in a number of industrial processes, the plate is fastened to a pivot arm by means of structure including an anchor pin. The pin fastening arrangement has proven unsatisfactory. In particular, the pin fastening arrangement permits sliding movement of the plate which results in erosion of the seat and plate seals, with consequent loss of sealing contact. Usage has also determined that the pin fastener structure also serves as a collection point for the powdery material and causes the pin to seize.

Accordingly, a need has existed for an improved valve which addresses and overcomes these problems. The invention is such a valve.

SUMMARY OF THE INVENTION

Accordingly, the invention relates to a flapper valve comprising a housing having a flow passage therethrough, the flow passage having positioned therein a seat structure and means for obstructing flow through the seat, i.e., a pivoted flapper plate member. The flapper plate member and the seat both comprise electrically conductive sealing materials, and the seat and the plate member are configured to provide or allow engagement. Novel means are further provided to bring the flapper plate member in and out of sealing contact or sealing engagement with the seat, as are flapper plate mount means comprising means for absorbing impact on contact between the flapper plate member and the seat and for allowing restricted three dimensional movement of said flapper plate member.

In order to illustrate the invention more fully, reference is made to the accompanying drawing, which sets forth a specific embodiment of the invention.

Figure 1:
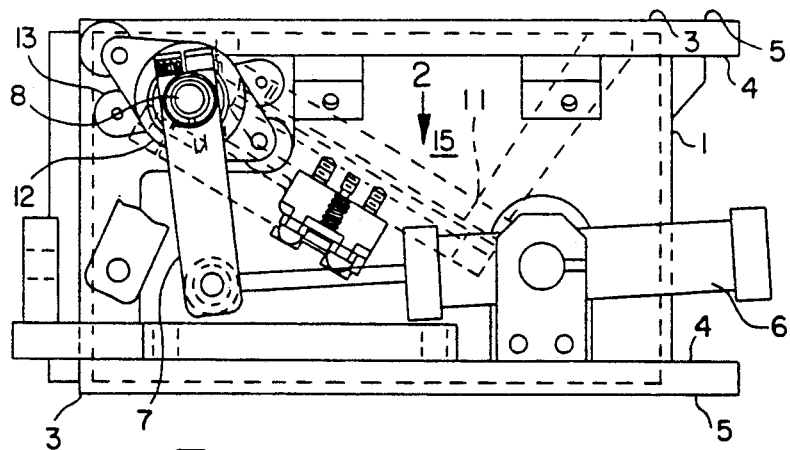
FIG. 1 is a side perspective of the valve of the invention, and also shows a pneumatic drive mechanism for driving the means actuating the valve's flapper member.
Figure 2:
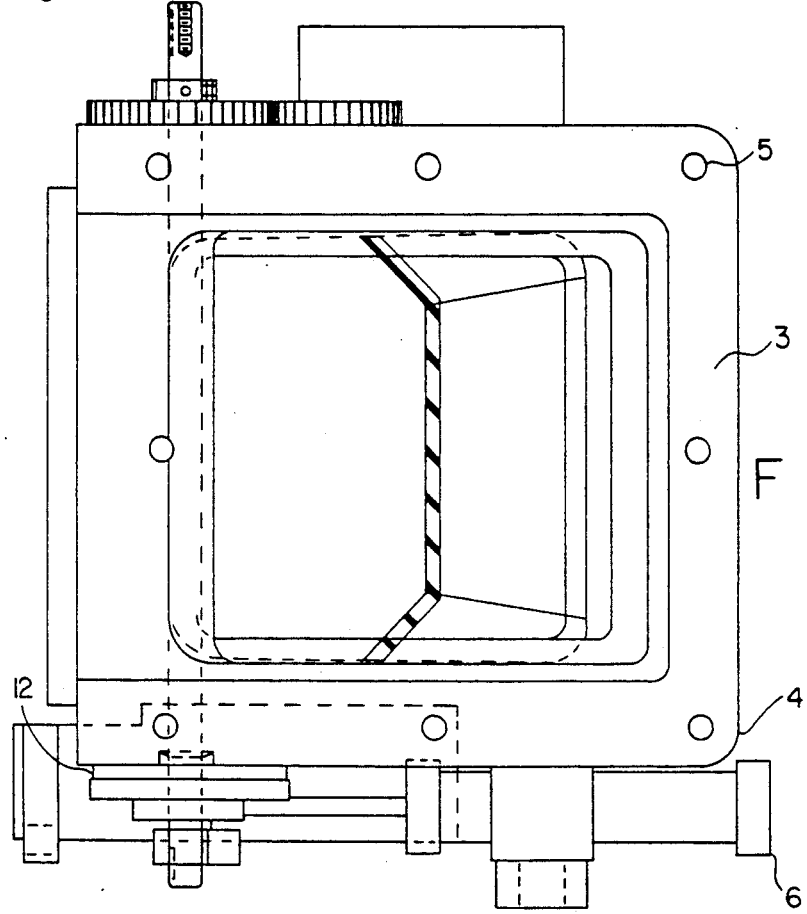
FIG. 2 is a top view.
Figure 3:
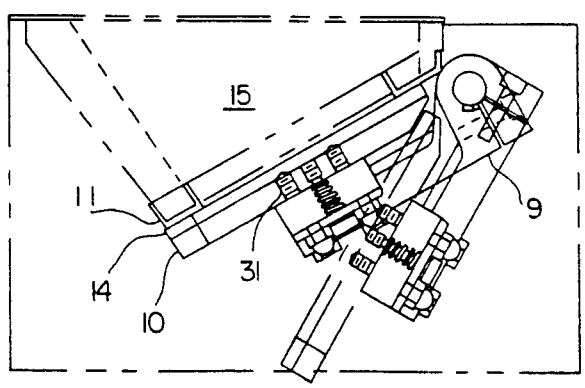
FIG. 3 is a profile view with the flapper member motion shown.

Referring particularly to FIGS. 1 through 3, there is shown a flapper valve having a housing or body 1 which defines a flow passage or flowpath 2. The housing may be a casting, and is provided at the ends 3 with flanged portions 4 which are perforated at 5 to receive bolts or the like by which the flow passage in the body or housing may be connected to adjacent ends of conduits or other structures having similar flanges. In this embodiment, external means, such as pneumatic piston-rod combination 6, drives pivoted member 7. Member 7 is connected to a portion of rotatable action shaft 8 which extends outside housing 1. Shaft 8 is partially rotated during operation by 7, and the shaft 8 is secured in the housing in a position transverse to the flowpath. Novel flapper arm 9, which depends from shaft 8, combines with means described more fully hereinafter to bring the flapper member 10 out of and into sealing contact or engagement with seat 11. Bearings and mounts 12 are provided for shaft 8 on both sides of the housing, and seal retainers 13 insure leak tight movement of shaft 8 in housing 1. Other attachment means for providing rotation for shaft 8 may be provided. For example (not shown), member 7 may be provided with means, such as a hexagonal shaft member, which might engage a corresponding hollow portion of shaft 8.

Flapper plate 10 is fixed to flapper arm 9, through means more fully described hereinafter, and plate 10 bears seal 14. Plate and seal are preferably positioned, along with seat 11, in housing 1 in such way as to provide sealing contact or engagement in the flowpath at an angle oblique or acute to the walls of the housing, forming a recess indicated generally as 15, although the angle of the closure is not critical.

Figure 4:
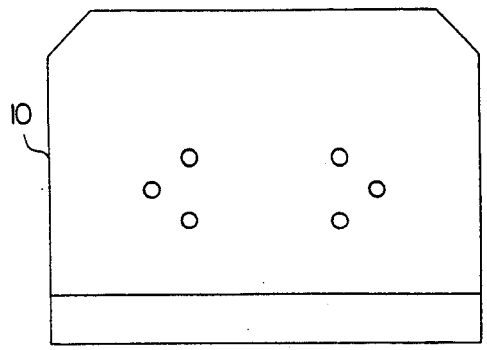
FIG. 4 shows a flapper plate plan view.
Figure 5:
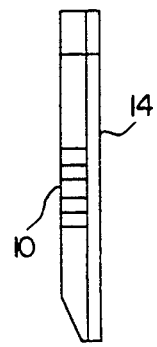
FIG. 5 shows a side view of the flapper plate member.
Figure 6:
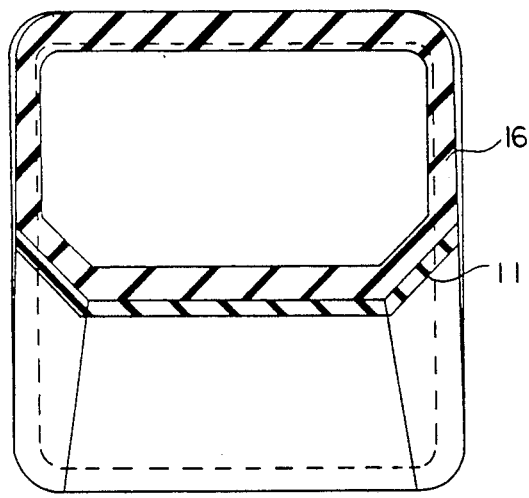
FIG. 6 shows a plan view of the valve seat and seal.

An important part of the invention is the provision of appropriate sealing means for the flapper plate 10 and for seat 11. Accordingly, flapper plate 10 and seat 11 are provided on their contacting or engaging surfaces with electrically conductive sealing materials which are securely bonded to the respective surfaces. As used hereinafter, the term "conductive" is understood to refer to electrical conductivity. The seals may be mounted in any suitable secure manner, but are preferably thermally bonded. In the case of a valve useful in aluminum powder transport, conductive rubber has been found to be effective. With reference particularly to FIGS. 4 through 6, a suitable flapper plate configuration is shown along with a corresponding or complementary seat configuration. FIG. 5 illustrates a side view of the flapper plate with the conductive rubber seal 14 bonded to the plate. Correspondingly, seat 11 is covered with a conductive rubber composite 16 bonded to the metal.

Flapper plate 10 and seat 11 are preferably made of stainless steel, although other metals may be used.

The flexible mounting of the flapper plate member is a critical part of the invention. According to the invention, means are provided so that restricted three dimensional movement of plate 10 may occur as the flapper plate is closed. The term "restricted," with reference to the movement of the plate, simply indicates a very limited movement to achieve proper seating of the plate, and is achieved by careful selection of materials or structures for the mounting members. In the mounts described hereinafter, materials for the mounts are selected from those materials having sufficient rigidity to insure that the plate will seal and remain sealed, but which also will have enough flexibility to provide minor adjustment as the plate is closing.

Any suitable means which will provide the limited three dimensional flexibility, suitably mounted on the novel flapper arm, may be provided. For example, a carefully selected spring or springs of proper rigidity, or a large flexible pad of proper size and proper rigidity, perhaps held by a base plate, might be used. However the configuration of FIGS. 7 through 9, in which a plurality of individual members are employed, is much preferred. In this embodiment, the flexible members and flapper plate coact in such manner that good flexibility is provided for proper seating, but the closure is secure. Thus, the flexible connector members preferably are spaced apart and mounted on the supporting structure, such as the mounting plate described hereinafter, or on a modified flapper arm, not shown, in sufficient number and in appropriate positioning, to provide the flexing support required. In general, mounts will preferably be attached to the flapper plate and supporting structure in multilateral symmetry, although this is not an absolute requirement.

Figure 7:
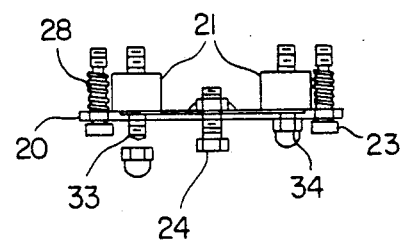
FIG. 7 is a side view of a flexible mount plate assembly.
Figure 8:
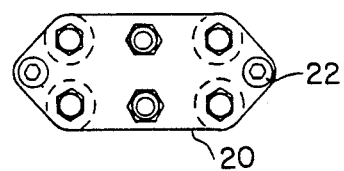
FIG. 8 shows a top or plan view of a flexible mount plate.
Figure 9:
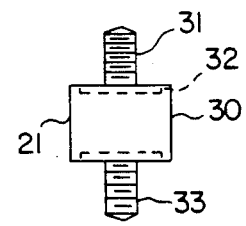
FIG. 9 is a section of a flexible mount of the invention.

Accordingly, attention is directed to FIGS. 7 through 9 for more a detailed illustration. FIG. 7 shows the assembly of flexible mounts on mounting plate 20, while FIG. 8 shows a flexible mount plate 20 for holding the flexible connector members in greater detail. Openings are provided in plate 20 for fastening the flexible mount members 21, and holes are provided, at 22 for the shoulder screws 23, and for the bolts of bolt-hex nut combination 24. FIG. 9 shows one flexible mount design that may be used in the invention. As shown, the mount 21 comprises a generally cylindrically shaped flexible connector member 30. A screw 31 with an enlarged head is retained in a cavity 32 at one end of flexible member 30, and a corresponding screw 33 is retained in a similar cavity at the opposite end of member 30. The mount may be fabricated by molding screws 31 and 33 therein. Alternately, retention lips for the screws may be provided (not shown). In the assembly, screw 33 passes through plate 20 and the member 21 is held in place by suitable means such as locknut 34. Screw 31, however, is threadingly engaged with the uncovered side of flapper plate 10, as illustrated previously in FIG. 3. Other means of connection of the flexible member to flapper plate 10 may be employed. Member 30 may be composed of any suitable durable flexible material, and is preferably a heavy duty rubber or other elastomer. As noted, the flexible mounting allows the flapper plate member to adjust to the seat when contact with the seat is made, the flexing ability permitting adjustment in three dimensions. This capability inhibits the sliding and misalignment found detrimental in previous flapper valves. Shoulder screws 23 are threadingly engaged in flapper plate 10, but pass unrestricted through holes 22 in base plate 20. Screws 23 bear springs 28 of suitable spring rate or constant which urge flapper plate 10 from base plate 20 and push the base plate 20 against the heads of screws 23. The shoulder screw-spring combinations thus serve to take the tension loading off flexible mounts 21 during opening of the valve, thereby inhibiting degradation of the flexible members 30. Those skilled in the art may select springs of appropriate spring constant, and other means may be provided for securing the springs in place. As shown, bolt-hex nut combinations 24 secure flexible mount plate 20 to flapper arm 9. As will be apparent, those skilled in the art may provide other suitable flexible mounts, and the invention is not limited to the specific structure shown in these illustrations.

Figure 10:
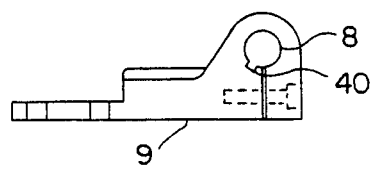
FIG. 10 is a profile of a flapper arm member.

To accommodate the flexible mount plate 20, flapper arm 9 is preferably shaped in the profile shown in FIG. 10. Thus, flapper arm 9 is reduced in thickness to accommodate or allow nesting of plate 20. However, arm 9 may be provided with holes, and possibly an enlarged end, to mount the members 30 (or similar structure) directly (not shown), although this may be more difficult from a fabrication standpoint. In the figure, the arm is secured to shaft 8 by any suitable means, such as keys forced into keyways 40. Those skilled in the art can adjust the motion of the pneumatic mechanism and the distance the flapper arm 9 pivots on shaft 8 to provide proper engagement or contact of flapper member 10 and seat 11. For example, if the piston rod movement is excessive, the position of the mount of the piston-rod drive may be adjusted, or an appropriate stop may be provided (not shown).

In operation, powdery material, such as an ultrafine powder (e.g., aluminum) flows into the recess 15 formed by the flapper plate member 10 and the seat 11 and related housing structure, where collection may or may not be allowed. As will be understood, the normal position for this valve is sealing engagement between seat 11 and flapper plate 10. Periodically, the actuating means, i.e., elements 8, 9, etc., are actuated externally to open flapper member 10, releasing the powder. Closure of flapper member 10 seals the portion of the valve 1 behind the flapper member, as well as any conduit connected thereto from the environment of recess 15.

As mentioned, the invention is particularly adapted for use with fine powdery materials, especially those having a particle size from 3 microns to 50 microns. Materials for which the valve of the invention is particularly suited are, inter alia, fine or ultrafine metallic powder, such as aluminum powder, coal and other fine solid carbonaceous powder, flour, silicas, and alumina powders. The conductive seals on the flapper member and seat may be selected according to the nature of the powder handled. For example, if fine coal is the powdery material, the seals may be of conductive ultra high molecular weight (UHMW) polyethylene. The seal on the flapper member and the seat may be of different materials. Finally, it is important, in dealing with fine powdery materials, that all surfaces in the valve which may collect the powdery materials be well polished to avoid any possibility of powder deposition.

The invention is not limited to the specific embodiments illustrated herein, it being understood that they are intended for example only. For example, although pneumatic drive means are shown for opening and closing the valve, other prime mover means may be used.

What is claimed is:

1. A flapper valve comprising a valve housing having a flow passage therethrough;
- a valve seat positioned in the flow passage so as to accommodate a flapper plate member, the valve seat comprising a peripheral seal of conductive material on its engaging surface;
- a flapper plate member comprising a sealing surface, the flapper plate member being positioned in the housing so that the sealing surface of the member may move alternately out of and into sealing contact with the seal on said seat, the flapper plate member comprising a conductive sealing material bonded to its engaging surface;
- actuating means comprising a rotatable shaft disposed in said housing on an axis transverse to said flow passage and an arm member pivoted on said shaft in said housing for opening and closing the valve by bringing the flapper plate member out of and into sealing contact with the seat, the arm member being connected to the flapper plate member through means for absorbing impact energy from the flapper plate member and allowing restricted three dimensional movement of said plate member, said means for absorbing impact energy and allowing restricted three dimensional movement comprising at least one flexible energy absorbing member.

2. The valve of claim 1 wherein the means for absorbing impact energy and allowing restricted three dimensional movement comprises a plurality of individual flexible energy absorbing members.

3. The valve of claim 1 wherein the means for absorbing impact energy is connected through a base plate member to said arm member.

4. The valve of claim 3 wherein the arm member is configured to nest the base plate.

5. The valve of claim 3 wherein means are mounted between the base plate and the flapper plate member for urging the flapper plate member from the base plate.

6. The valve of claim 5 wherein the means for urging the flapper plate from the base plate comprise a plurality of springs.

7. The valve of claim 1 wherein the conductive sealing material is conductive rubber.

8. A flapper valve comprising a valve housing having a flow passage therethrough;
- a valve seat positioned in the flow passage so as to accommodate a flapper plate member, the valve seat comprising a peripheral seal of conductive material on its engaging surface;
- a flapper plate member comprising a sealing surface, the flapper plate member being positioned in the housing so that the sealing surface of the member may move alternately out of and into sealing contact with the seal on said seat, the flapper plate member comprising a conductive sealing material bonded to its engaging surface;
- actuating means comprising a rotatable shaft disposed in said housing on an axis transverse to said flow passage and an arm member pivoted on said shaft in said housing for opening and closing the valve by bringing the flapper plate member out of and into sealing contact with the seat, the arm member being connected to the flapper plate member through means comprising means for absorbing impact energy from the flapper plate member and allowing restricted three dimensional movement of said plate member, said means for absorbing impact energy and allowing restricted three dimensional movement comprising at least one flexible energy absorbing member.

9. The valve of claim 8 wherein the means for absorbing impact energy and allowing restricted three dimensional movement comprises a plurality of individual flexible energy absorbing members.

10. The valve of claim 9 wherein at least one end of the rotatable shaft extends through the valve housing, and at least a portion of the shaft extending through the housing is of sufficient length for and shaped to allow attachment of external means for partial rotation of said shaft.

11. The valve of claim 10 wherein the means comprising means for absorbing impact energy comprises a base plate member which is detachably connected to said arm member and said plurality of flexible energy absorbing members.

12. The valve of claim 11 wherein the arm member is configured to nest the base plate.

13. The valve of claim 12 wherein the flexible energy absorbing members comprise individual rubber mounting members detachably attached to the flapper plate member and to the base plate.

14. The valve of claim 13 wherein means are mounted between the base plate and the flapper plate member for urging the flapper plate member from the base plate.

15. The valve of claim 8 wherein the conductive sealing material is conductive rubber.

16. A flapper valve comprising a valve housing having a flow passage therethrough;
- a valve seat positioned in the flow passage so as to accommodate a flapper plate member, the valve seat comprising a peripheral seal of conductive material on its engaging surface;
- a flapper plate member comprising a sealing surface, the flapper plate member being positioned in the housing so that the sealing surface of the member may move alternately out of and into sealing contact with the seal on said seat, the flapper plate member comprising a conductive sealing material bonded to its engaging surface;
- actuating means comprising a rotatable shaft disposed in said housing on an axis transverse to said flow passage, at least one end of the rotatable shaft extending through the valve housing, and at least a portion of the shaft extending through the housing being of sufficient length for and shaped to allow attachment of external means for partial rotation of said shaft;
- an arm member pivoted on said shaft in said housing for opening and closing the valve by bringing the flapper plate member out of and into sealing contact with the seat, the arm member being connected to the flapper plate member through a base plate and means comprising a plurality of individual flexible energy absorbing members comprising individual rubber mounting members detachably attached to the flapper plate member and to the base plate, the base plate being detachably connected to said arm member, the arm member being configured to nest the base plate; and
- means comprising a plurality of springs mounted between the base plate and the flapper plate for urging the flapper plate member from the base plate.

17. The valve of claim 16 wherein means external to said valve are connected to said rotatable shaft for periodically providing partial rotation to said shaft and bringing the flapper plate out of and into sealing contact with said seat.

18. The valve of claim 16 wherein the conductive sealing material is conductive rubber.

* * * * *